(12) United States Patent
Komatsu (10) Patent No.: US 7,209,262 B2
(45) Date of Patent: Apr. 24, 2007

(54) METHOD AND APPARATUS FOR PROCESSING IMAGE SIGNAL AND COMPUTER-READABLE RECORDING MEDIUM RECORDED WITH PROGRAM FOR CAUSING COMPUTER TO PROCESS IMAGE SIGNAL

(75) Inventor: Manabu Komatsu, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 869 days.

(21) Appl. No.: 09/771,999

(22) Filed: Jan. 30, 2001

(65) Prior Publication Data

US 2001/0019427 A1 Sep. 6, 2001

(30) Foreign Application Priority Data

Jan. 31, 2000 (JP) ............................. 2000-022997

(51) Int. Cl.
*G06K 15/00* (2006.01)
(52) U.S. Cl. .................. 358/2.1; 358/1.9; 358/1.18; 358/518; 358/523; 358/539; 382/166; 382/167
(58) Field of Classification Search ............... 358/539, 358/523, 518, 1.9, 1.18, 2.1; 382/166, 167
See application file for complete search history.

(56) References Cited

U.S. PATENT DOCUMENTS 5,900,953 A * 5/1999 Bottou et al. ............... 358/540
6,067,377 A * 5/2000 Hata ........................... 382/167
6,636,628 B1 * 10/2003 Wang et al. ................ 382/167
6,778,684 B1 * 8/2004 Bollman ..................... 382/112

FOREIGN PATENT DOCUMENTS

| JP | 61-288662 A | 12/1986 |
| JP | 04-40072 | 2/1992 |
| JP | 07-327141 | 12/1995 |
| JP | 09149281 A * | 6/1997 |
| JP | 09-193477 | 7/1997 |
| JP | 09-282471 A | 10/1997 |

* cited by examiner

*Primary Examiner*—Douglas Q. Tran
*Assistant Examiner*—Chan S. Park
(74) *Attorney, Agent, or Firm*—Dickstein Shapiro LLP (57) ABSTRACT

In a method for processing an image signal, in which method input image information for an input image is converted into an image forming controlling signal for an image forming apparatus, a conversion from said input image information into said image forming controlling signal is controlled based on a type of a drawing object for the input image and background information for a background where the drawing object is formed.

9 Claims, 10 Drawing Sheets

METHOD AND APPARATUS FOR PROCESSING IMAGE SIGNAL AND COMPUTER-READABLE RECORDING MEDIUM RECORDED WITH PROGRAM FOR CAUSING COMPUTER TO PROCESS IMAGE SIGNAL

BACKGROUND OF THE INVENTION

1. Field of the Invention

The present invention generally relates to methods and apparatuses for processing an image signal and computer-readable recording media recorded with a program for causing a computer to process an image signal, and more particularly to a method and an apparatus for processing an image signal and a computer-readable recording medium recorded with a program for causing a computer to process an image signal, which relate an input image to a type of a drawing object in order to output an image of high quality.

2. Description of the Related Art

In a conventional image processing method, image data is input from a scanner or a host computer; output color elements C (Cyan), M (Magenta), Y (Yellow) and K (blacK), which are control signals of an image forming apparatus such as a color copier or the like, are processed by a uniform color conversion; and then the image data is output from the image forming apparatus such as the color copier or the like. In this conventional method, it is difficult to reproduce an optimized color of a compound document which document is displayed on a monitor of the host computer.

For example, different types of objects are combined by a page description language so that a compound document including both a monochrome photograph and a color photograph, a graphic image and text can be created. However, when the color conversion is conducted on the compound document based on a picture output, a text or a graphic image becomes a pale color with less impact. On the other hand, when a color of the compound document is reproduced with a strong saturation corresponding to a business graphic, a photograph color is deteriorated and a color selected as a background color is reproduced at high density. Consequently, characters on the background color are not clearly visible or easily readable.

Methods that solve the above problems are described, for example, in the Japanese priority applications No. 9-282471 and No. 9-193477.

In the Japanese priority application No. 9-282471, based on an image type (character data, graphic data or raster graphic data) in the page description language, a characteristic of each pixel is determined. Also, technologies for conducting processes, which influence a print quality, such as a middle tone process, a gamma correction, a filter process and a masking process, are described. Thus, according to the invention described in the Japanese priority application No. 9-282471, it is possible to control an image output signal based on the image type and to output an image of high-grade quality.

In addition, in the Japanese priority application No. 9-193477, a color printer is described in which print data is referred to, an attribute related to color correction for each object is determined and a color correction function corresponding to the determined attribute is selected. Thus, according to the invention described in the Japanese priority application No. 9-193477, each object type is automatically determined and the color correction is conducted for each object.

The color correction in the invention in the Japanese priority application No. 9-193477 will be now described.

In general, a color reproduction range of an electronic picture or inkjet printer is narrower than that of a television set, a CRT display or the like. Thus, various color correction technologies have been proposed for correcting a difference between the color reproduction range of an input color image and that of an output color image. The color correction technologies are always required for a color image output apparatus if it has a limited the color reproduction range.

Regarding the color correction, further methods that solve the above problems are described, for example, in the Japanese priority applications No. 4040072 and No. 7-327141.

In a color correction method described in the Japanese priority application No. 4040072, it is determined whether or not a desired color in a uniform color space or an HVC color space (a color space consisted of information of brightness, hue and saturation) is out of the color reproduction rage for an output image. That is, when the desired color is out of the color reproduction rage for an output image, a saturation having the same brightness and hue as the desired color is corrected to be a maximum value and then the image is output.

Moreover, in a color image signal processing method described in the Japanese priority application No. 7-327141, a brightness component is compressed in accordance with a reproduction brightness ratio of an input system to an output system and then a saturation component is compressed and converted into color image data within the color reproduction range of the output image.

However, in the inventions described in the Japanese priority applications No. 9-282471 and No. 9-193477, the image output signal is controlled by the image type alone. That is, an object color is controlled regardless of a background color. Thus, an unbalance between the object color and the background color still remains.

Consequently, the above inventions have a disadvantage in that characters on the background color are not clearly visible and easily readable.

Also, according to the inventions described in the Japanese priority applications No. 4040072 and No. 7-32714, the color correction is controlled regardless of the background color. Thus, the color correction is not properly conducted relative to the background color.

Consequently, these inventions have a disadvantage in that characters on the background color are not clearly visible and easily readable.

SUMMARY OF THE INVENTION

It is a general object of the present invention to provide methods and apparatuses for processing an image signal, and computer-readable recording media recorded with a program for causing a computer to process an image signal, in which the above-mentioned problems are eliminated.

A more specific object of the present invention is to provide a method and an apparatus for processing an image signal, and a computer-readable recording medium recorded with a program for causing a computer to process an image signal, in which, based on an image type and background information, an image output signal and a color correction are controlled so as to obtain a compound document in which characters and line drawings on the background color are clearly visible.

The above objects of the present invention are achieved by a method for processing an image signal, in which method input image information for an input image is converted into an image forming controlling signal for an image forming apparatus, the method including the step of: (a) controlling a conversion from the input image information into the image forming controlling signal based on a type of a drawing object for the input image and background information for a background where the drawing object is formed.

According to the above invention, it is possible to provide a method in which a compound document, in which characters and line drawings on the background color are clearly visible and easily readable, can be output.

The above objects of the present invention are achieved by an apparatus for processing an image signal, in which apparatus input image information for an input image is converted into an image forming controlling signal for an image forming apparatus, the apparatus including: an object type determining part determining a type of a drawing object for an input image; a background color information extracting part extracting background information for a background where the drawing object is formed; and a controlling part controlling a conversion from the input image information into the image forming controlling signal based on the type of the drawing object and the background information.

According to the above invention, it is possible to provide an apparatus in which a compound document, in which characters and line drawings on the background color are clearly visible and easily readable, can be output.

The above objects of the present invention are achieved by a computer-readable recording medium recorded with a program for causing a computer to process an image signal, in which computer input image information for an input image is converted into an image forming controlling signal for an image forming apparatus, the program including the codes of: (a) determining a type of a drawing object for the input image; (b) extracting background information for a background where the drawing object is formed; and (c) controlling a conversion from the input image information into the image forming controlling signal based on the type of the drawing object and the background information.

According to the above invention, it is possible to provide a computer-readable recording medium recorded with a program for causing a computer to process an image signal in which a compound document, in which characters and line drawings on the background color are clearly visible and easily readable, can be output.

BRIEF DESCRIPTION OF THE DRAWINGS

In the following, embodiments of the present invention will be described with reference to the accompanying drawings.

DESCRIPTION OF THE PREFERRED EMBODIMENTS

First Embodiment

Figure 1:
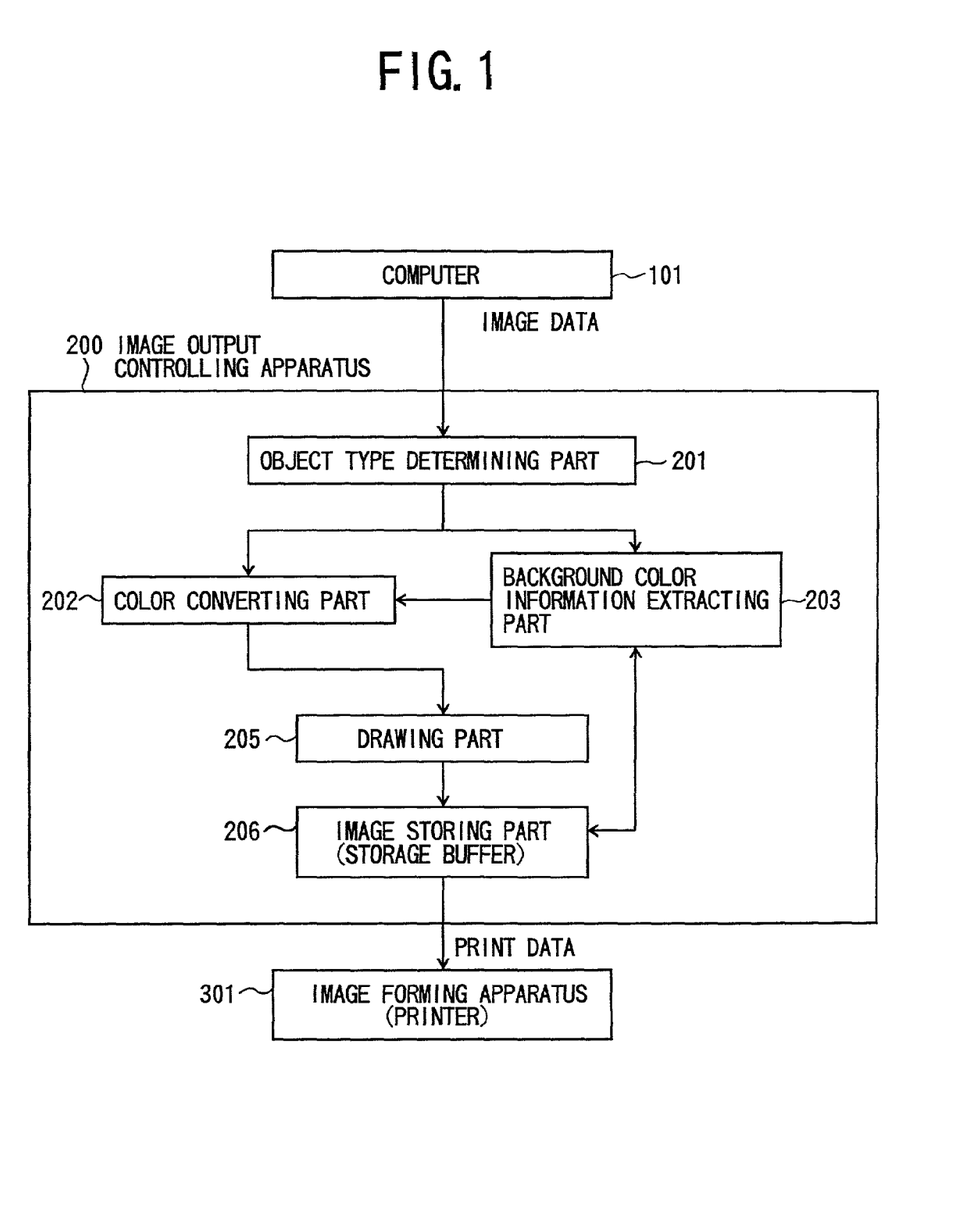
FIG. 1 is a diagram showing an image output controlling apparatus according to a first embodiment of the present invention.

FIG. 1 is a diagram showing an image output controlling apparatus according to a first embodiment of the present invention. The image output controlling apparatus corresponds to the image signal processing apparatus in the claims.

In FIG. 1, a computer 101 controls an image output controlling apparatus 200. When the computer 101 receives an output instruction from an operator, the computer 101 sends a set of image data for a compound document such as image data input by image pickup, both a monochrome picture and a color picture edited by a DTP (DeskTop Publishing) software, a graphic image, and a text, to the image output controlling apparatus 200. The image output controlling apparatus 200 analyzes the image data sent from the computer 101, converts input image information into control signals such as output color elements C (Cyan), M (Magenta), Y (Yellow) and K (blacK), and transmits the control signals to an image forming apparatus (printer) 301 such as a color copier or the like. In the image forming apparatus 301, a transmitted image based on the control signals is output (printed).

The image output controlling apparatus 200 may be mounted in the image forming apparatus (printer) 301 and conduct a color conversion. Otherwise, the image output controlling apparatus 200 may be mounted in the computer 101.

Alternatively, the image output controlling apparatus 200 may be mounted in a printer controlling apparatus that is provided separately independent of the image forming apparatus (printer) 301, and conduct the color conversion and then send converted color information to the image forming apparatus (printer) 301.

Moreover, the embodiment can be realized by software. In this case, a printer driver resident in the computer 101 as a program may execute the above processes.

The output controlling apparatus 200 includes at least an object type determining part 201; a color converting part 202 for converting input image data into the control signals for the image forming apparatus 301, the control signals corresponding to a drawing object type and background information for forming a drawing object thereon; a background color information extracting part 203 for extracting color information of a background on which the drawing object is formed; a drawing part 205 for developing a print image (image data) and conducting a synthesizing process, a γ-conversion process and a middle tone process in accordance with a drawing instruction described by a page description language (PDL) or the like; and an image storing part (storage buffer) 206 for temporarily storing the print image for one or more pages drawn by the drawing part 205.

The image output controlling apparatus 200 may include the color converting part 202 for obtaining a print output equal to a display image based on characteristics of an image displaying apparatus and a printer, and a resolution converting part for converting into a resolution corresponding to each machine type.

In this embodiment, in detail, the image data to be input into the image output controlling apparatus 200 is contrast data of RGB (Red, Green and Blue). Generally, a contrast for each color element is indicated by 8 bits=256 grades. However, any number of contrast grades, such as 64 or 512 grades, can be used.

Operations of the image output controlling apparatus 200 will now be described. The object type determining part 201 receives the image data for a compound document and then recognizes the drawing object type (character code, graphic code or raster graphic data) and its attributes (type, size, color, thickness and the like). Subsequently, the object type determining part 201 determines whether or not to control the color conversion and then sends the image data to the color converting part 202 and the background color information extracting part 203 based on the determination result.

The input image data is directly transmitted from the object type determining part 201 to the color converting part 202. In the color converting part 202, for example, the image data such as an image object or a painted graphic is converted into the output color elements C, M, Y and K, which are the control signals of the image forming apparatus (printer) 301, so as to correspond to an image display by the color conversion based on characteristics of the image display apparatus and the image forming apparatus (printer) 301, which apparatuses are used by a user.

The color conversion, from each contrast data of RGB (Red, Green and Blue) into each data of the output color elements C, M, Y and K, converts into CMYK data by a memory map interpolation.

Figure 2:
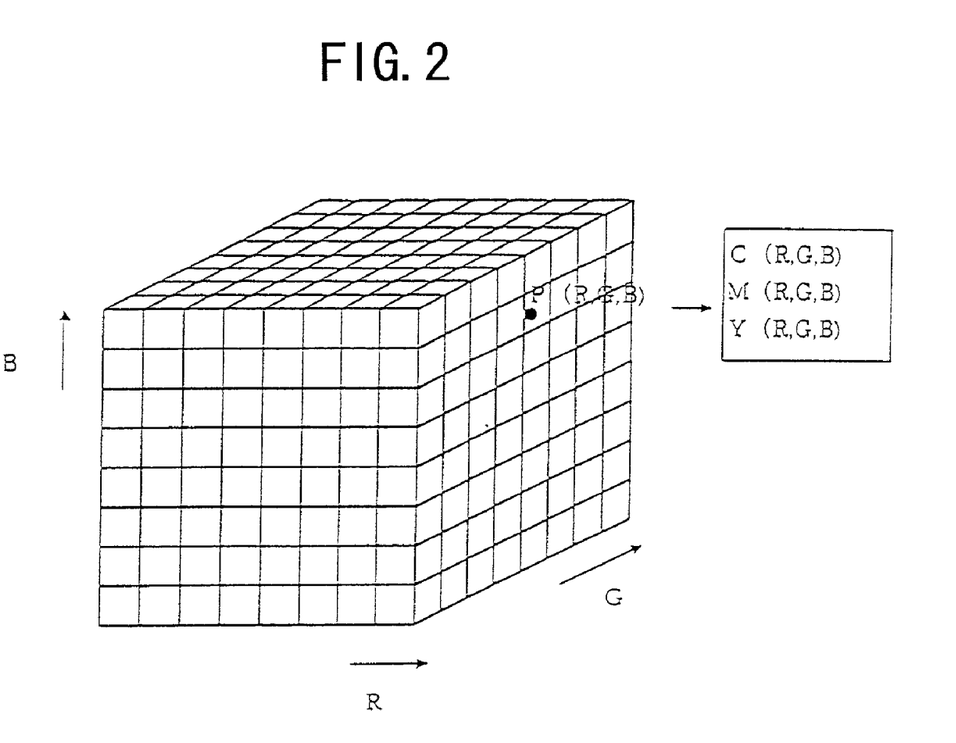
FIG. 2 is a diagram for explaining a color conversion.

In the memory map interpolation, as shown in FIG. 2, in a case in which the RGB space is defined as an input color space, the RGB space is divided into solid graphics (cubes in this case) of the same type. To obtain an output value (converting each data into the output color elements C, M, Y and K) at an input point P(RGB), a cube including the input point is selected and then a linear interpolation is conducted based on predetermined output values on vertices of the selected cube and a position (distance from each vertex) of the input point in the cube.

In FIG. 2, the input point P(RGB) and an output value (C(RGB), M(RGB), Y(RGB)) are related to each other by an interpolation operation. By changing the interpolation operation based on the drawing object type, even the same point P(RGB) can be converted into a different output value (C(RGB), M(RGB), Y(RGB)).

In the first embodiment, three factors of the output value correspond to three values of the color elements C, M and Y, respectively. In the RGB-coordinates used for the interpolation operation, a relationship (L*a*b*-CMY) between an actual input and an actual output is measured and then RGB(L*a*b*) is calculated by the least squares method using the measured data. Then, values of the output elements C, M and Y are predetermined to correspond to the calculated RGB(L*a*b*).

Also, the control signals C, M and Y are converted into the control signals C', M', Y' and K by for example the following operations:

$$K = \alpha \times \min(C, M, Y) \quad (1)$$

$$C' = C - \beta \times K$$

$$M' = M - \beta \times K$$

$$Y' = Y - \beta \times K.$$

It should be noted that the color conversion is not limited to the above method. The control signals C, M and Y may be directly converted into the control signals C', M' and Y'.

Also, for example, the computer 101 may store the characteristics of the image display apparatus in header information of the image data and transmit the characteristics. In a case in which the image output controlling apparatus 200 is mounted in the computer 101, for example, a device profile standardized by ICC (Inter Color Consortium) is read out and used.

For example, in the background color information extracting part 203, information including a character drawing start address, a character size, a character type and the like is extracted and an area on which characters are formed is calculated based on image data corresponding to character information, which image data is transmitted from the object type determining part 201 to the background color information extracting part 203. The area is dependent on the character size, the character type or the like. Also, an area location is dependent on the character drawing start address.

Figure 3:
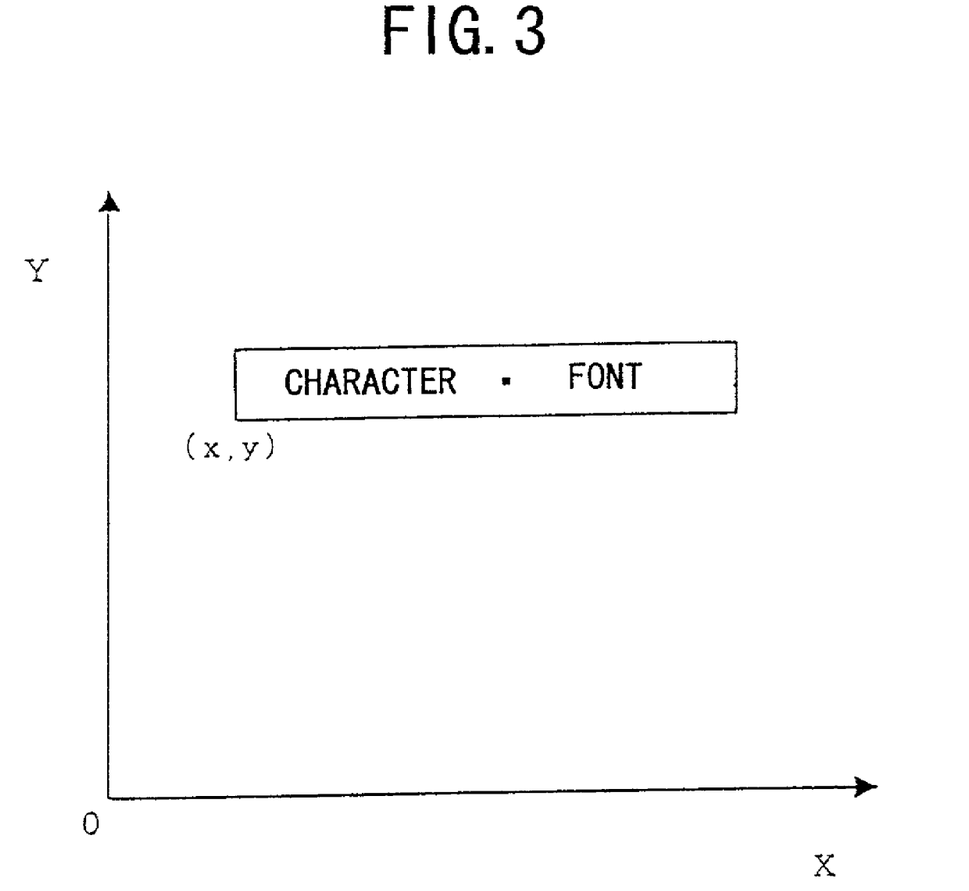
FIG. 3 is a diagram for explaining a background color extracting part.

In the background color information extracting part 203, as shown in FIG. 3, the background color information of the calculated area is extracted as an average of colors of all the pixels within the area for an image developed in the image storing part (storage buffer) 206.

Figure 4:
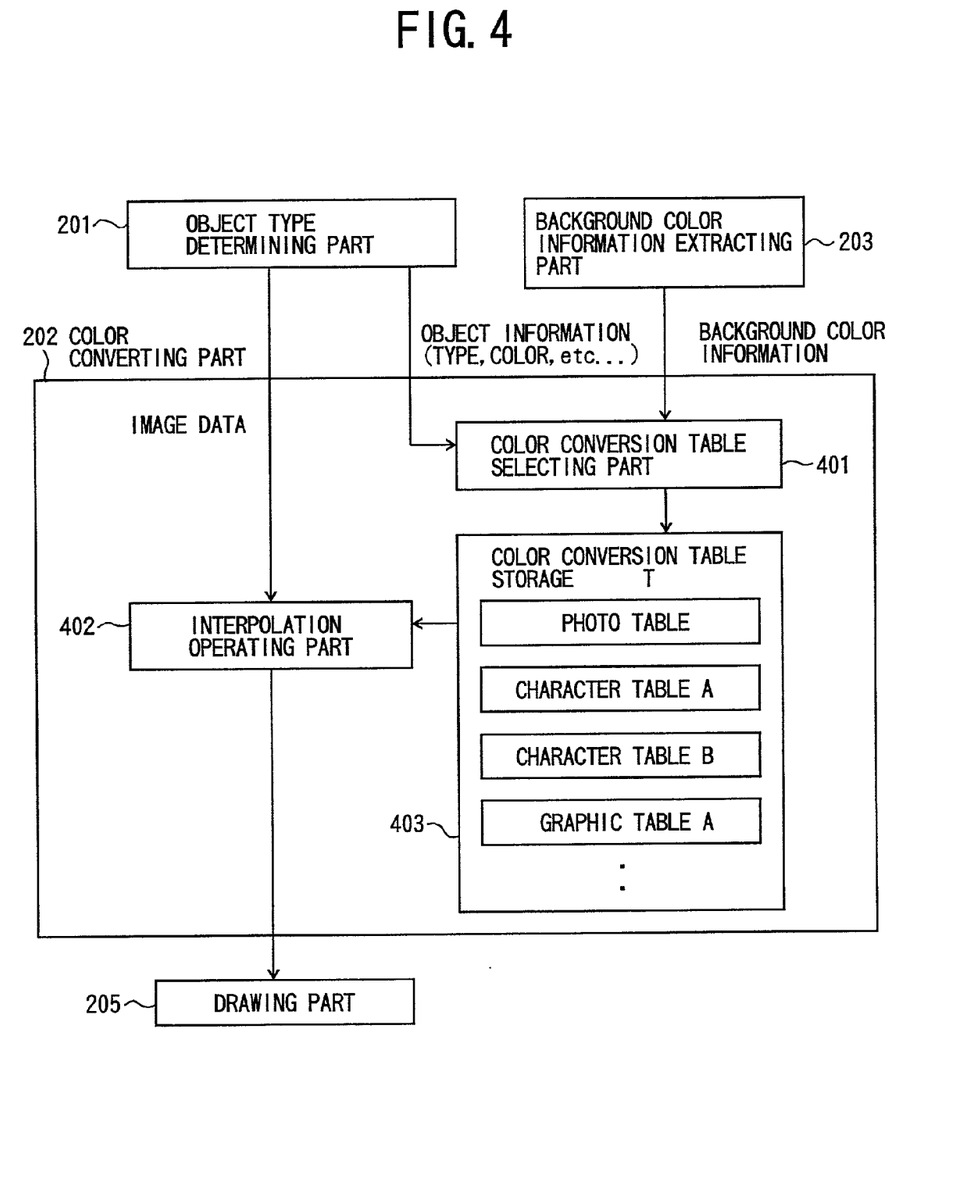
FIG. 4 is a diagram for explaining a color converting part.

A process of the color converting part 202 will now be described with reference to FIG. 4. In FIG. 4, the color converting part 202 includes a color conversion table selecting part 401, an interpolation operating part 402 and a color conversion table storage 403. The color conversion table storage 403 stores tables for various drawing object types such as a photo table, a character table A, a character table B, graphic table A and so on. The color conversion table selecting part 401 in the color converting part 202 refers to the drawing object (for example, character) type, color information (Ri, Gi, Bi) and the background color information (Rb, Gb, Bb) from the background color extracting part 203; and selects an optimal color conversion table from the color conversion table storage 403, which table is sent to the interpolation operating part 402. The interpolation operating part 402 refers to the selected color conversion table; executes, for example, the memory map interpolation as described above; and then sends the image data to the drawing part 205.

In the color conversion table selecting part 401, for example, when the drawing object is a character and it is determined that a character color and the background color, for which the color conversion is conducted, are similarly bright colors, the character table A for outputting by colors having the same hue and a high density is transmitted to the interpolation operating part 402. On the other hand, when it is determined that a contrast between the character color and the background color, for which the color conversion is conducted, is stronger, the character table B for outputting colors that are closer to monitor display colors is transmitted to the interpolation operating part 402. By the above determination, it is possible to make a character more visible with respect to the background.

It should be noted that the character table A is for the color conversion while the brightness remains and the character table B is for the color conversion while the saturation remains.

In the image output controlling apparatus 200 described above, it is possible to output the compound document in which a character or a line drawing on the background color is clearly visible for any input image information.

Also, in FIG. 4, the drawing object color is changed based on the object information and the background information. However, in the present invention, it is also possible to change the background color based on the drawing object information and the background information. In this case, the color conversion table storage 403 stores various conversion tables for the background. For example, the conversion table storage 403 stores a conversion table for a case of a uniform background, a conversion table for a case of a gradation background, or the like.

Figure 5:
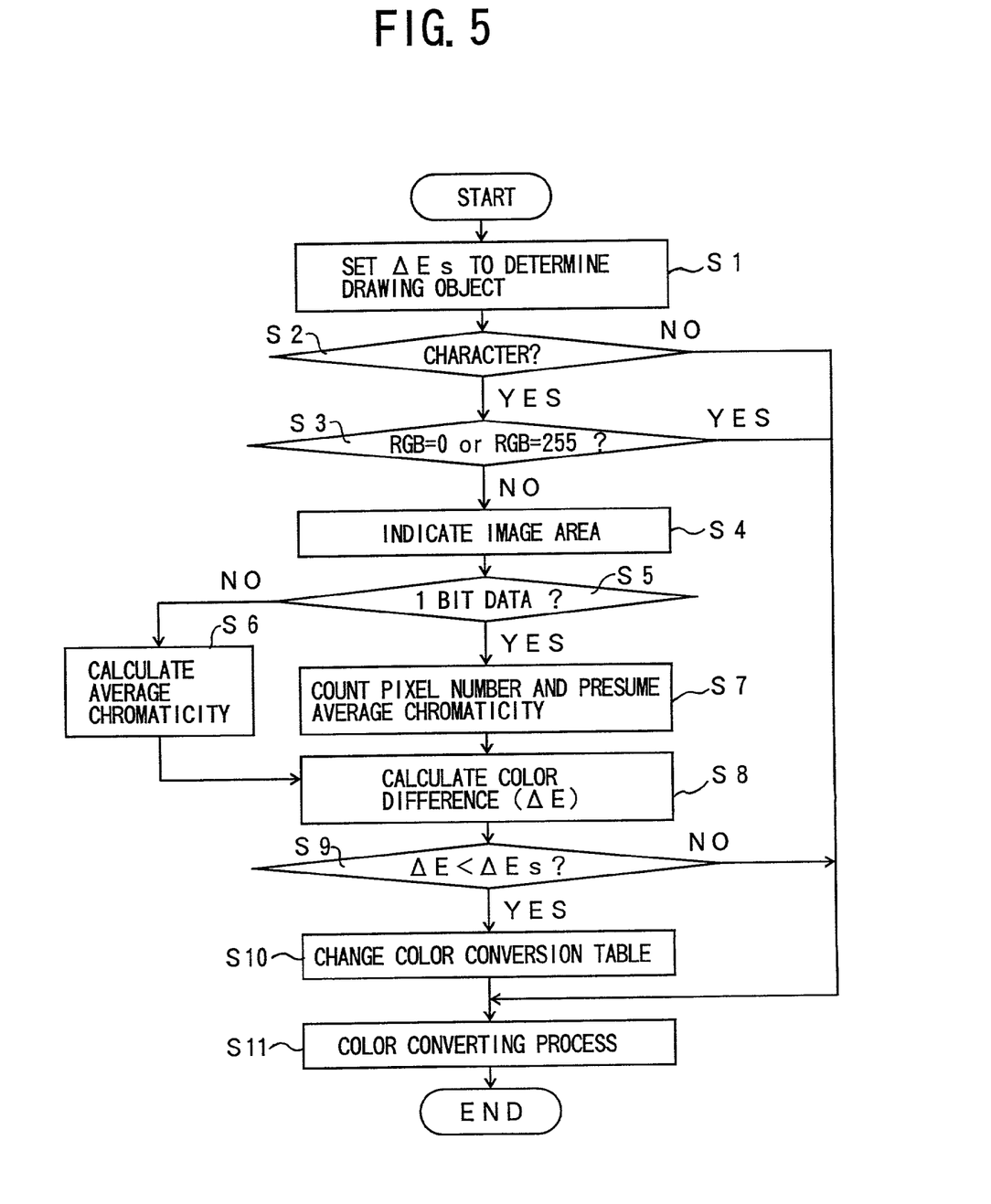
FIG. 5 is a flowchart for explaining an image processing method executed by an image output controlling apparatus.

FIG. 5 is a flowchart for explaining an image processing method executed by the image output controlling apparatus 200. In this embodiment, for the sake of convenience, it is assumed that the drawing object is a character. But, any drawing object other than the character can be processed in the same method.

In step S1, image data of a compound document or the like is received and the drawing object type (character code, graphic code or raster graphic data) and the content information (type, size, color, thickness and the like) are recognized. Color difference information ΔEs between the drawing object and the background is set to a predetermined value to determine whether or not to change the color conversion table.

In step S2, it is determined whether or not the drawing object is the character information. When it is determined that the drawing object is other than the character information, the process skips to step S11 and color conversion using a default color conversion table is executed. Then, the process is terminated.

The default color conversion table is set to output image data closer to the monitor display color.

When it is determined in the step S2 that the drawing object is the character information, it is determined in step S3 whether or not color information (R,G,B) of the drawing object is all 0 (zero) or 255, that is, whether the color information indicates black or white. When the color information (R,G,B) is all 0 (zero) or 255, the process skips to the step S11 and color conversion using the default color conversion table is executed. Then, the process is terminated.

When it is determined in step S3 that the color information (R, G, B) is not all 0 (zero) or 255, the drawing start address, the character size, the character type and the like are referred to and an image area including the background to form the character is calculated in step S4.

In step S5, it is determined whether or not each pixel of a background area in the image area obtained in the step S4 is shown by binary data or multiple data.

In the step S5, for example, when it is determined that the background in the image area for drawing the drawing object is shown by the multiple data, each of the color elements R, G and B within the background of the image area is averaged and each of average values Rave, Gave, Bave is obtained in step S6. And then, for example, L*a*b* that shows a color in the uniform color space is calculated by the following expressions:

$$X = 0.4124 \times R + 0.3575 \times G + 0.1805 \times B, \quad (2)$$
$$Y = 0.2126 \times R + 0.7152 \times G + 0.0722 \times B,$$
$$Z = 0.4124 \times R + 0.1192 \times G + 0.9505 \times B.$$

$$L^* = 116(Y/Y_0)^{1/3} - 16 \ (Y/Y_0 > 0.008856), \quad (3)$$
$$a^* = 500 \ [(X/X_0)^{1/3} - (Y/Y_0)^{1/3}]$$
$(X_0, Y_0 \text{ and } Z_0 \text{ are values of a reference reflection surface}),$ $$b^* = 200 \ [(Y/Y_0)^{1/3} - (Z/Z_0)^{1/3}].$$

It should be noted that the above operations convert into L*a*b*, which is color information in the uniform color space, so as to be suitable for human visual sense.

Also, in a case of the color elements R, G and B, when the background is painted, an average chromaticity value can be calculated directly from the color elements R, G and B. On the other hand, when the background is a gradation, the average chromaticity value of the entire background can be calculated by obtaining an average of a changing direction of the chromaticity.

In step S7, when it is determined in the step S4 that the background in the image area where the drawing object is drawn is indicated by binary data of the color elements C, M, Y and K (that is, when the input image is converted into control signals for forming an image), a pixel number is counted for each color element. Then, the pixel number for each color element is divided by a total pixel number of the image area and then the pixel number for each of color elements C, M, Y and K per area unit is obtained. For example, values of L*a*b* are presumed by a color in the uniform color space based on the pixel number as an appearance frequency of the color element in step S7.

In step S8, a color difference ΔE between the background color components Lh, ah and bh calculated in the step 6 or the step 7 and the drawing object color components Lo, ao and bo is obtained by the following expression:

$$\Delta E = [(Lh-Lo)^2 + (ah-ao)^2 + (bh-bo)^2]^{1/2} \quad (4).$$

In step S9, the color difference ΔE calculated in the step S8 is compared with the color difference information ΔEs between the drawing object color and the background color which information is calculated in the step S1. When the calculated ΔE is greater than the predetermined ΔEs, the process skips to the step S11 and the color conversion using the default color conversion table is executed. Then, the process is terminated.

On the other hand, when the calculated ΔE is less than the predetermined ΔEs, in step S10, a optimum color conversion table is selected based on conditions obtained in the above steps.

In step S11, color conversion using the optimum color conversion table selected in the step S10 is executed.

In the above method, for example, even if a part of character information is sent as a graphic image because a character decoration or the like is performed by application software, the process in accordance with the flowchart described in FIG. 5 can be executed. Thus, there is no problem such that a part of a character color is improperly changed.

Therefore, according to the first embodiment of the present invention, for any input image information, it is possible to prevent an objectionable and unsuitable color in a text. In addition, it is possible to output a compound document so that characters and line drawings on the background color are clearly visible and easily readable.

Figure 6:
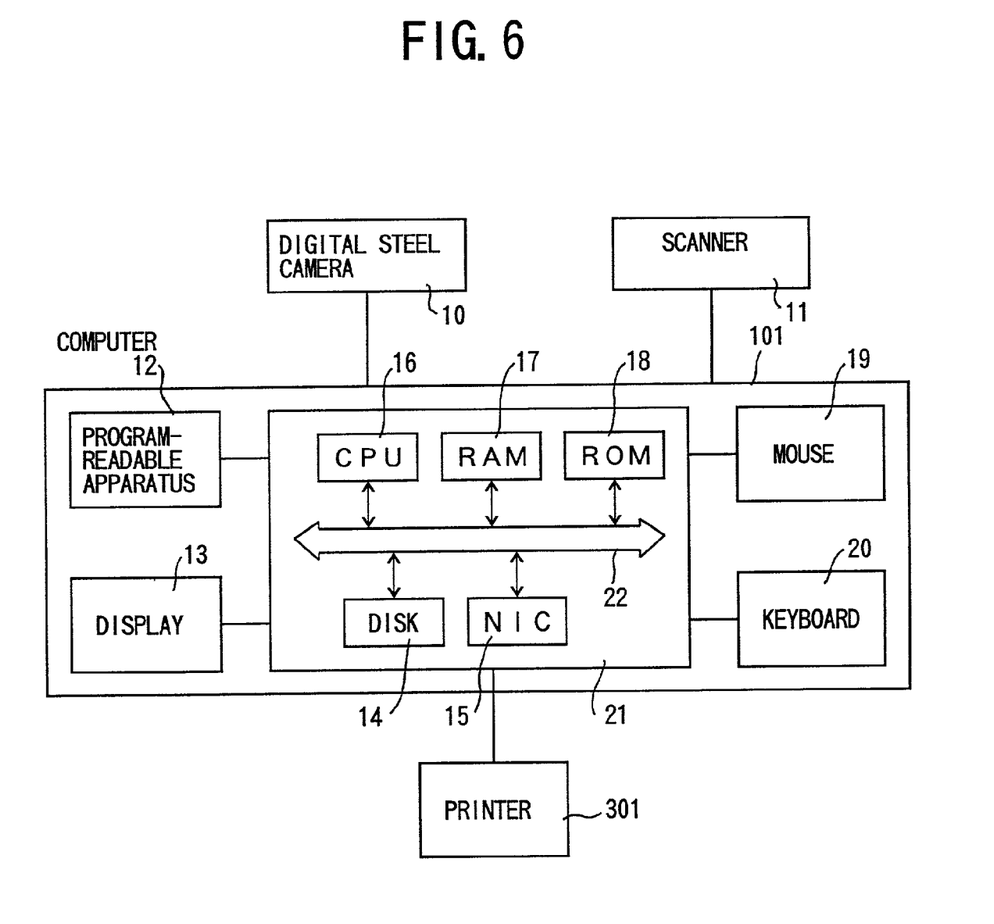
FIG. 6 is a diagram showing a concrete configuration of an information processing system for the image processing system.

FIG. 6 is a diagram showing a concrete configuration of an information processing system for the image processing system.

In the information processing system, the computer 101 as a workstation is connected to the printer 301. The computer 101 can realize functions of the image output controlling process (the image signal process) and includes a program-readable apparatus 12, a display 13, a keyboard 20 and an operating unit 21.

In the operating unit 21, a RAM 17 and a ROM 18 are connected to a CPU 16 executing various commands via a bus 22. Also, the bus 22 is connected to a DISK 14 that is a large capacity storage and a NIC 15 for communicating with devices through networks.

The program-readable apparatus 12 is an apparatus, for example, a floppy disk drive, an optical disk drive, a magneto-optical disk drive or the like, for reading program codes recorded on a storage medium such as a floppy disk, a hard disk, an optical disk (CD-ROM, CD-R, CD-R/W, DVD-ROM, DVD-RAM or the like), a magneto-optical disk, a memory card, or the like. The program codes recorded on the storage medium are read by the program-readable apparatus 12 and then stored in the DISK 14. The CPU 16 executes the program codes stored in the DISK 14. Thus, the above-described method for processing an image signal can be realized. Alternatively, in this embodiment, by executing the program code read by the computer 101, an OS (Operating System), a device driver or the like, that is activated in the computer 101, may conduct a part of or the entire process. Thus, the above-described method for processing an image signal can be realized.

Second Embodiment

In a second embodiment, the present invention can be realized with or without the first embodiment.

Figure 7:
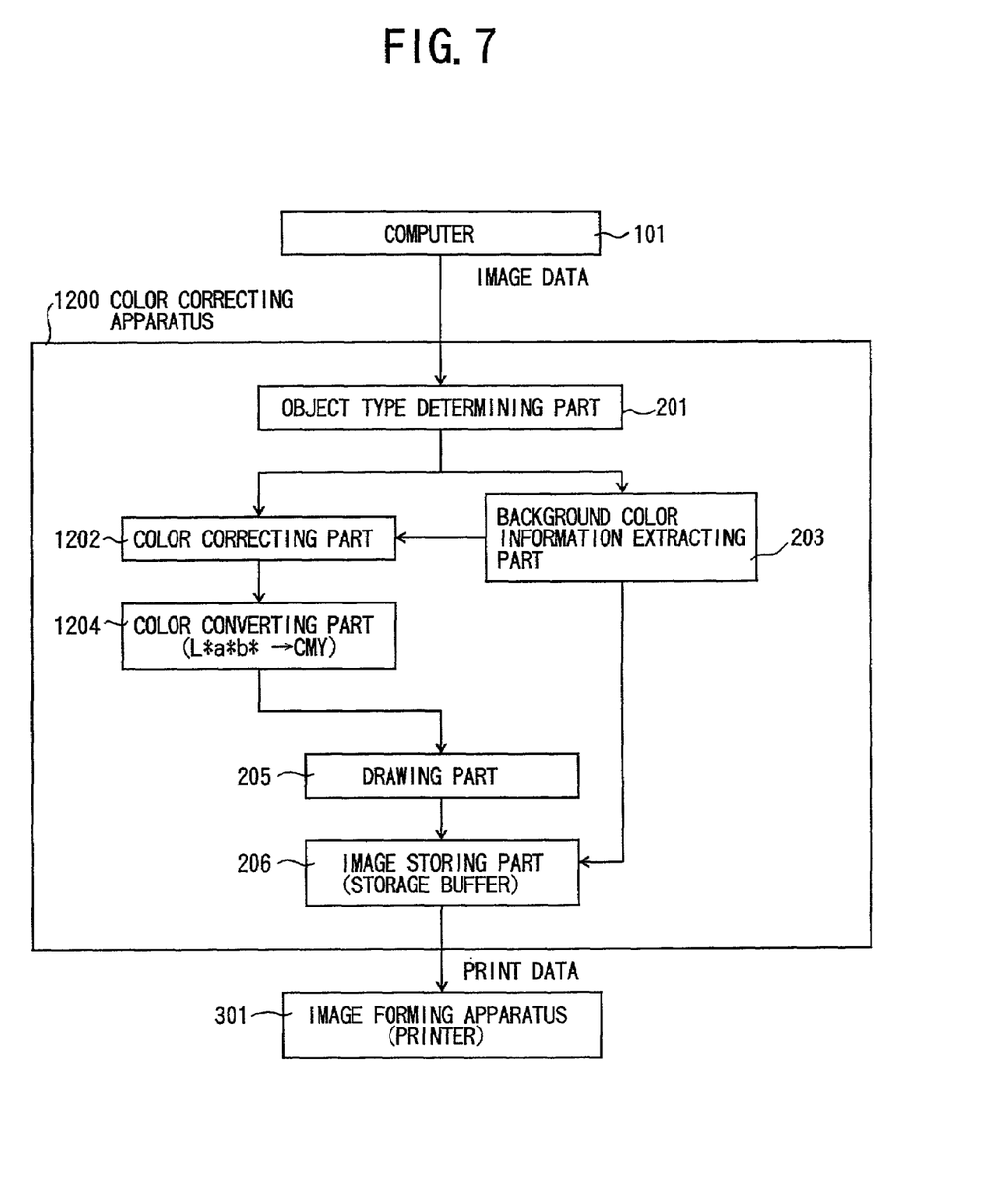
FIG. 7 is a block diagram of a color correcting apparatus according to a second embodiment of the present invention.

FIG. 7 is a block diagram of a color correcting apparatus according to the second embodiment of the present invention.

In FIG. 7, the computer 101 controls the color correcting apparatus 1200. When the computer 101 receives an output instruction from an operator, the computer 101 send the color correcting apparatus 1200 a compound document including image data input by an image pickup, both a monochrome photograph and a color photograph, a graphic image, and text.

The color correcting apparatus 1200 analyzes image data sent from the computer 101. In the color correcting apparatus 1200, by a color correcting process that will be described later, a color indicated in the image data is compressed within a color reproduction range of the image forming apparatus (printer) such as a color copier and then color conversion is performed to convert the image data into output color elements C (Cyan), M (Magenta), Y (Yellow) and K (blacK) as control signals. Then, the result of the color conversion is transmitted to the image forming apparatus 301.

The image forming apparatus (printer) 301 prints an image based on the result.

The color correction apparatus 1200 can be mounted inside of the image forming apparatus (printer) 301 or inside of the computer 101. Alternatively, the color correction apparatus 1200 can be mounted inside of a printer controlling apparatus provided independent of the image forming apparatus (printer) 301, and the image data can be transmitted to the image forming apparatus (printer) after the color conversion is conducted.

Also, this embodiment can be realized by software. In this case, a printer driver resident in the computer 101 as a program may realize this embodiment.

The color correction apparatus 1200 includes at least the object type determining part 201; a color correcting part 1202 for compressing a color indicated by input color image data to within the color reproduction range of a printer based on a drawing object type and a background color on which a drawing object is formed and then mapping the drawing object; the background color information extracting part 203 for extracting color information of a background where the drawing object is formed; a color converting part 1204 for converting a L*a*b* value compressed and mapped within the color reproduction range of the printer into control signals for the printer; a drawing part 205 for developing a print image (image data) and conducting a synthesizing process, a γ-conversion process and a middle tone process in accordance with a drawing instruction described by a page description language (PDL) or the like; and an image storing part (storage buffer) 206 for temporarily storing the print image for one or more pages drawn by the drawing part 205.

In this embodiment, in detail, the image data to be input into the image correcting apparatus 1200 is contrast data of RGB (Red, Green and Blue). Generally, a contrast for each color element is indicated by 8 bits=256 grades. But, any number of contrast grades, such as 64 or 512 grades, can be used.

Operations of the image correcting apparatus 1200 will now be described. Similarly to the first embodiment, the object type determining part 201 receives image data of a compound document and then recognizes the drawing object type (character code, graphic code or raster graphic data) and its attributes (type, size, color, thickness and the like). Subsequently, the object type determining part 201 determines whether or not to control a compressing and mapping direction toward inside of the color reproduction range of the printer and then sends the image data to the color correcting part 1202 or the background color information extracting part 203 based on the determination result. For example, when the image data is an image object, a painted graphic or the like, the image data is sent directly from the object type determining part 201 to the color converting part 1204. In the color correcting part 1202, for example, L*a*b* in the uniform color space is calculated based on a color temperature of a CRT monitor, color coordinates and a photoelectric transfer characteristic by the following expressions:

$$X = 0.4124 \times R + 0.3576 \times G + 0.1805 \times B \quad (2)$$
$$Y = 0.2126 \times R + 0.7152 \times G + 0.0722 \times B$$
$$Z = 0.193 \times R + 0.1192 \times G + 0.9505 \times B.$$

$$L^* = 116(Y/Y_0)^{1/3} - 16 \; (Y/Y_0 > 0.008856), \quad (3)$$
$$a^* = 500\,[(X/X_0)^{1/3} - (Y/Y_0)^{1/3}]$$
($X_0$, $Y_0$ and $Z_0$ are values of a reference reflection surface), $$b^* = 200\,[(Y/Y_0)^{1/3} - (Z/Z_0)^{1/3}].$$

It should be noted that the above operations convert into L*a*b*, which is color information in the uniform color space, so as to be suitable for human visual sense.

Figure 8A:
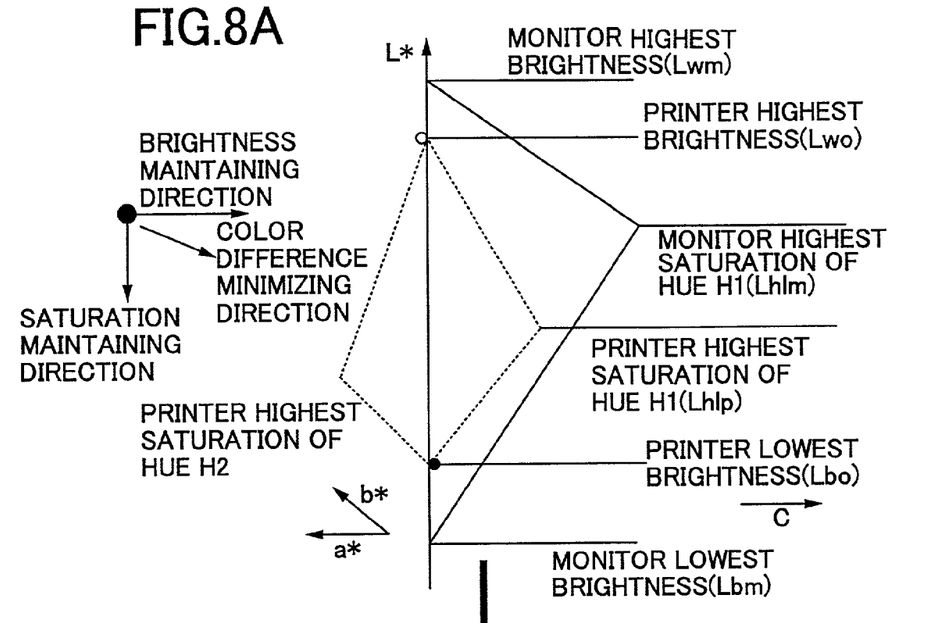
FIG. 8A and FIG. 8B are diagrams for explaining a color correction.

In addition, a compressing process for a brightness component of input color image signals is executed by using the following expression where Lwhite (corresponding to Lwp in FIG. 8(A)) and Lblack (corresponding to Lbp in FIG. 8(A)) denote the highest brightness (white point) and the lowest brightness (black point), respectively:

$$L^* = L^* \times (L\text{white} - L\text{black}) \div 100 + L\text{black} \quad (5).$$

The above expression (5) changes a color, which brightness component (L*) is outside of the color reproduction range of the printer for input color image signals, to a color which brightness component (L*) is inside of the color reproduction range of the printer. That is, FIG. 8A and FIG. 8B show a changing operation of a color.

Figure 8B:
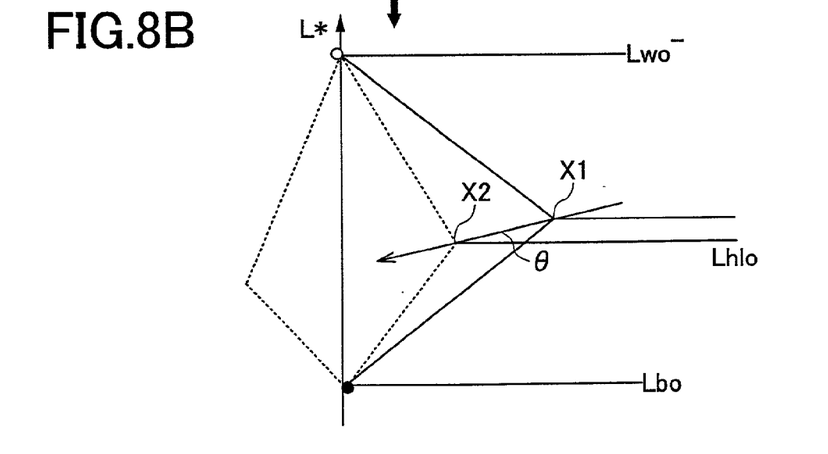

Moreover, in the color correcting part 1202, when a color is still outside of the color reproduction range of the printer after the above brightness compressing process, for example, the color is mapped to another color located at the outer most border of the color reproduction range of the printer in a color difference minimizing direction (corresponding to the color converting process from a solid line to a dot line shown in FIG. 8B). In FIG. 8A and FIG. 8B, the mapping from the solid line to the dot line in a horizontal direction maintains the brightness. Also, the mapping in a vertical direction maintains the saturation. Actually, for example, in FIG. 8B, X1 is mapped to X2 at a predetermined angle θ.

In the converting part 1204, the input image data, which is compressed in the color correcting part 1202, is converted into output color elements C, M, Y and K as control signals for the image forming apparatus (printer) 301 by the color conversion based on the characteristics of the image forming apparatus (printer) 301 for L*a*b* in the uniform color space. After that, the input image data is sent to the drawing part 205 and the image storing part (storage buffer) 206.

In the color conversion in the color correcting part 1202, similarly to the first embodiment, the memory map interpolation is used.

Also similarly to the first embodiment, the image data for character information is sent from the object type determining part 201 to the background color information extracting part 203. In the background color information extracting part 203, a drawing start address, a character size, a character type and the like are extracted and then an area forming a character is calculated.

Also similarly to the first embodiment, in the background color information extracting part 203, an average color of all the pixels within the area is output for the image developed in the image storing part (storage buffer) 206.

Figure 9:
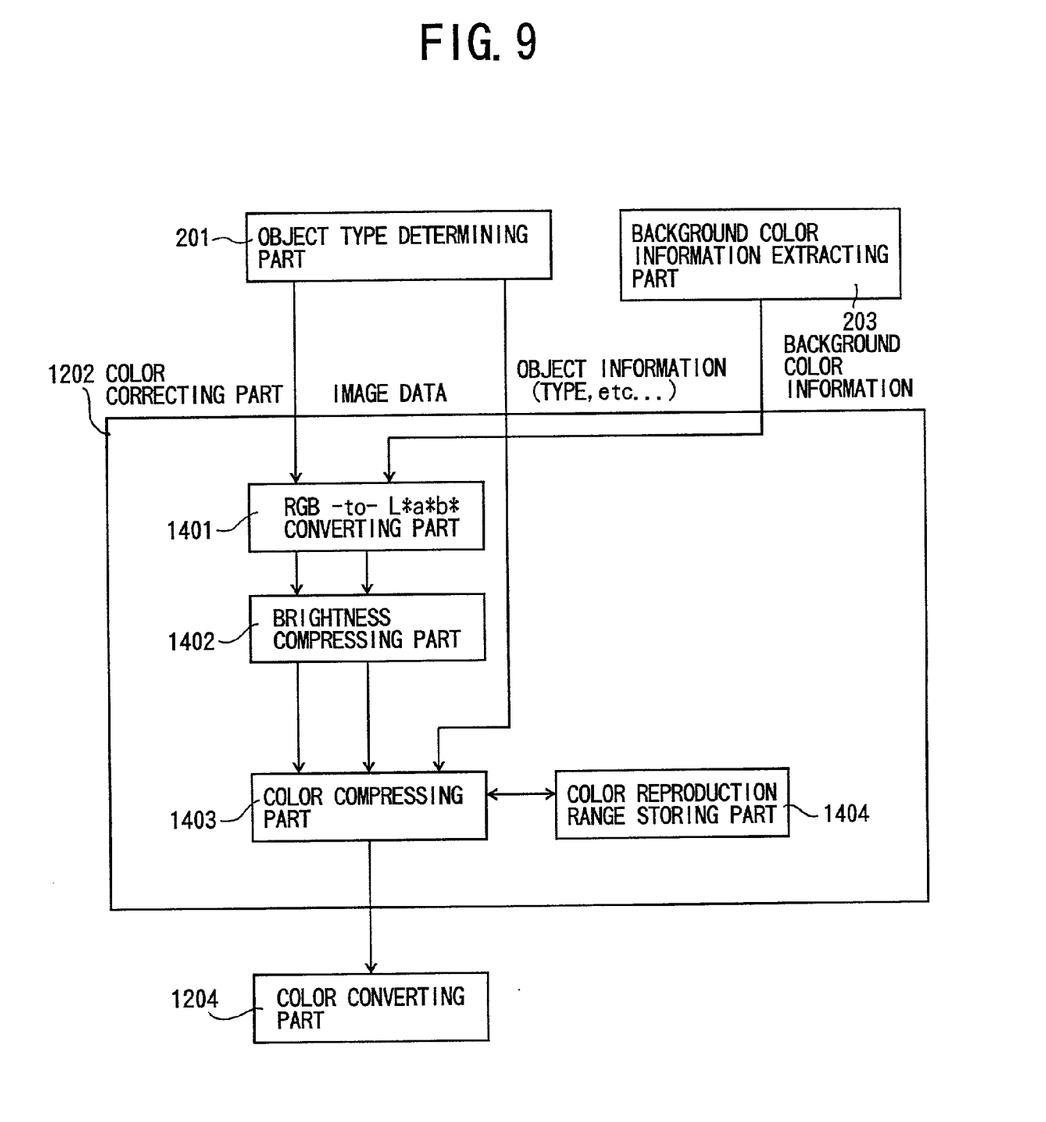
FIG. 9 is a flowchart for explaining a color correcting part.

A process executed by the color correcting part 1202 will be now described with reference to FIG. 9.

An RGB-to-L*a*b* converting part 1401 in the color correcting part 1202 converts an input color into CIEL*a*b*, which is a typical uniform color space, by the above expressions (2) and (3). A brightness compressing part 1402 in the color correcting part 1202 refers to the highest brightness (white point) and the lowest brightness (black point) of the printer and then adjusts the brightness component (L*) of the input color image signal to be within the color reproduction range of the printer (a process from FIG. 8A to FIG. 8B).

A color compressing part 1403 in the color correcting part 1202 refers to data in a color reproduction range storing part 1404 to determine whether or not the drawing object color is located outside of the color reproduction range of the printer. When it is determined that the drawing object color is located outside of the color reproduction range of the printer, based on the drawing object type (for example, a character), color information (L*a*b*in), and background color information (L*a*b*back) from the background color information extracting part 203, that is, based on for example, a color difference and the above color information (L*a*b*in), a compressing direction is determined in a condition of a constant hue and a range from the brightness maintaining direction to the saturation maintaining direction. Then, the outer most border color of the color reproduction rage of the printer in the compressing direction is selected from the color reproduction range storing part 1404 and is sent to the color converting part 1204.

In the color compressing part 1403, similarly to the first embodiment, the color difference is obtained from the expression (4). For example, when it is determined that the color difference between a character color and the background color is small and both colors have a similar color brightness, the drawing object color is mapped to a color in the compressing direction for outputting the same hue and high density (minimum color difference and maintained saturation). On the other hand, when it is determined that a contrast between the character color and the background color is stronger, the drawing object color is mapped to a color in the compressing direction for outputting closer to the monitor display color (maintained brightness and minimum color difference).

To convert a color while minimizing the color difference and maintaining the saturation is to change the brightness of the color while maintaining the hue and the saturation. To convert a color while maintaining the brightness and minimizing the color difference is to change the saturation of the color while maintaining the hue and the brightness.

In the color correcting apparatus described above, for any input color image information, it is possible to output a compound document in which a character or a drawing line on the background color can be clearly visible and easily readable.

Figure 10:
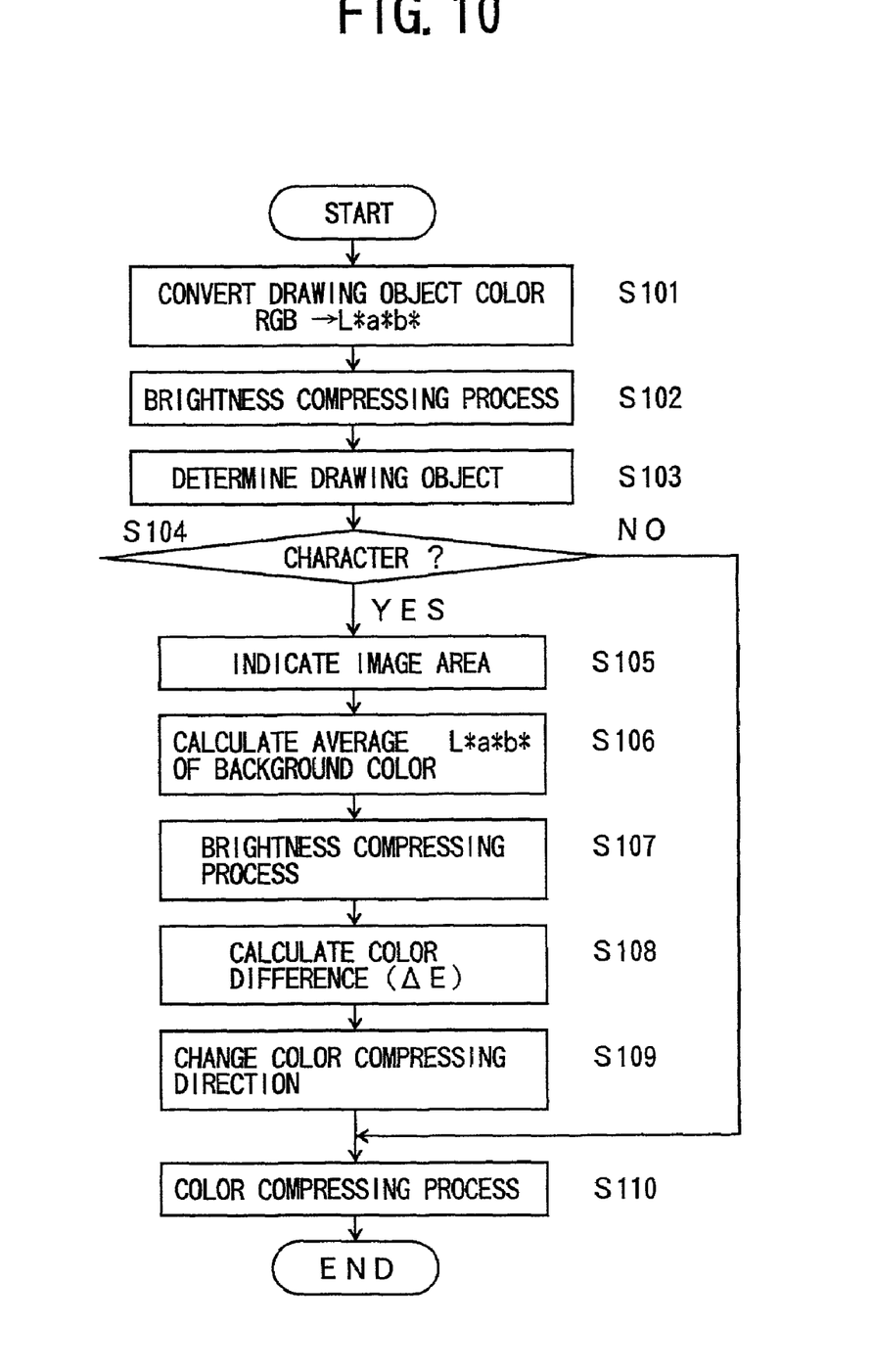
FIG. 10 is a flowchart for explaining a color correcting process executed by a color correcting apparatus.

FIG. 10 is a flowchart for explaining a color correcting process executed by the color correcting apparatus 1200.

In step S101, the image data of the compound document is received and color information (RGB) of the drawing object is converted into CIEL*a*b*, which is the typical uniform color space, by the above expressions (2) and (3).

In step S102, the highest brightness (white point) and the lowest brightness (black point) of the printer are referred to and the brightness component (L*) of the input color image signal is adjusted to the color reproduction range of the printer (see FIG. 8A and FIG. 8B).

In step S103, the image data of the compound document is received, the drawing object type (character code, graphic code, raster graphic data) and its attributes (type, size, color, thickness and the like) are recognized. In step S104, it is determined whether or not the drawing object is a character. When the drawing object is an object other than the character, the process skips to step S110. In the step S110, the color correction (the color compressing process) is conducted in a default color compressing direction for a color which is outside of the color reproduction range of the printer and then the process is terminated.

It should be noted that a default color compressing direction is a color difference minimizing direction so as to output the drawing object with the closest display color and may be changed based on the hue, but is not limited to the above.

When it is determined that the drawing object is the character in step S104, the process goes to step S105. In the step S105, information including the drawing start address, the character size, the character type and the like are referred to and then the area forming the character is calculated.

In step S106, similarly to the first embodiment, each average of the color elements RGB, CMY and CMYK is obtained and then L*a*b* in the uniform color space is calculated.

In step S107, the brightness compression is conducted based on the expression (5).

In step S108, similarly to the first embodiment, the color difference ΔE between the color components Lh, ah and bh of the background color calculated in the step S106 and the step S107 and the color components Lo, ao and bo of the drawing object calculated in the step S106 and the step S107 are calculated by the above expression (4).

In step S109, color compression parameters are selected from the color difference ΔE calculated in the step S108, the color components Lo, al and bo of the drawing object and the like and changed. Then, the color compression is conducted in the color compressing direction set in the step S110.

Also, the color compression in the steps S109 and S110 is conducted in a direction where the hue H obtained by the following expression (6) is maintained within a range (the predetermined angle θ shown in FIG. 8B) from the brightness maintaining direction to the saturation maintaining direction.

$$\text{hue } H = a^* \tan 2(b^*, a^*) \times 180/\pi \text{ where } H=0 \text{ when } a=b=0 \text{ and } H=360+H \text{ when } H<0 \quad (6).$$

According to the method described above, for example, even if the character information including graphics is sent because character decoration is performed by the application software, the process in accordance with the flowchart shown in FIG. 10 is conducted. Therefore, there is no problem such that a color of a part of the character is changed to be objectionable.

Therefore, it is possible to prevent a compound document from including an objectionable color and also it is possible to output a compound document where a character and a drawing line are clearly visible and easily readable.

Similarly to the first embodiment, the information processing system as shown in FIG. 6 can be configured to realize the image processing system according to the second embodiment. A detailed explanation of the configuration of the information processing system will be omitted.

According to the present invention, it is possible to output a compound document in which characters and line drawings on the background color are clearly visible and easily readable.

In addition, the background information for the drawing object can be evaluated by an average of background colors in the area where the drawing object is formed.

Therefore, even if the background of the compound document is specially decorated such as a gradation, picture or the like, the color reproducing method for a drawing object is properly determined.

Also, the background information is evaluated by a value based on an appearance frequency, as a reference, of a single color forming image in an area where the drawing object is formed.

Therefore, even if background information for the background indicates a CMY signal or a CMYK signal, an average of background colors in the background can be obtained so as to properly determine the color reproducing method for a drawing object.

In addition, when image information for the drawing object indicates black or white, the conversion to the image forming controlling signal based on the background information is not controlled.

Therefore, it is possible to eliminate an unnecessary conversion process when image information for the drawing object indicates black or white.

Moreover, when a color difference between color information for the drawing object and background information in an area where the drawing object is formed is smaller than a predetermined color difference, the conversion into the image forming controlling signal based on the background information is controlled.

Therefore, even if the color difference between the color information for the drawing object and the background information in the area where the drawing object is formed is smaller than the predetermined color difference, it is possible to output a compound document where characters and line drawings on the background color are clearly visible and easily readable.

Also, the predetermined color difference is defined based on a character type, a character size, a character style, a character color, a line type, a line thickness and a part of or the entire line color.

Therefore, it is possible to properly control the conversion based on attributes of the drawing object such as a character type, a character size, a character style, a character color, a line type, a line thickness and a part of or the entire line color.

In addition, a color, in said input image, located outside of a color reproduction range of said color image forming apparatus is corrected to another color located inside of the color reproduction range.

Therefore, it is possible to conduct a proper color correction so as to obtain the compound document where characters and line drawings on the background color are clearly visible and easily readable.

Also, the direction to compress and map a color, in said input image, located outside of said color reproduction range, is controlled toward another color located inside of said color reproduction range based on the type of the drawing object for said input image and the background information where said drawing object is formed.

Therefore, it is possible to conduct a proper color correction so as to obtain the compound document where characters and line drawings on the background color are clearly visible and easily readable.

In addition, the direction to compress and map the color is controlled within a range from a direction maintaining a hue and a brightness to another direction maintaining a saturation.

Therefore, it is possible to conduct a proper color correction so as to obtain the compound document where characters and line drawings on the background color are clearly visible and easily readable.

Also, the background information indicates an average of the background colors in an area where said drawing object is formed.

Therefore, even if the background of the compound document is specially decorated such as a gradation, picture or the like, the color reproducing method for a drawing object is properly determined.

The present invention is not limited to the specifically disclosed embodiments, and variations and modifications may be made without departing from the scope of the present invention.

The present application is based on the Japanese priority application No. 2000-022997 filed on Jan. 31, 2000, the entire contents of which are hereby incorporated by reference.

What is claimed is:

1. An image processing apparatus for converting an input image signal into a control signal including a plurality of output color factors of an image forming apparatus, said image processing apparatus comprising:
- an object determining part determining a type and attributes of a drawing object from the input image signal;
- a background color information extracting part extracting background color information corresponding to a determination result of the object determining part from the input image signal; and
- a color converting part conducting a color conversion with respect to the input image signal based on the type and attributes of the drawing object and the background color information; and wherein the color converting part includes:
- a color conversion table storing part storing a plurality of color conversion tables;
- a selecting part referring to the type and attributes of the drawing object and the background color information and selecting one color conversion table from the plurality of the color conversion tables; and
- a compensation calculating part conducting a compensation calculation with respect to the image data based on the color conversion table selected by the selecting part.

2. The image processing apparatus as claimed in claim 1, wherein the background color information is an average value of a background color in an area where the drawing object is formed.

3. The image processing apparatus as claimed in claim 1, wherein the type of the drawing object is one of character code, graphic code, and raster graphic data.

4. The image processing apparatus as claimed in claim 1, wherein the attributes of the drawing object include at least one of a type, a size, and a thickness.

5. The image processing apparatus as claimed in claim 1, wherein the plurality of the color conversion tables includes:
- a first color conversion table converting in a state retaining brightness of an image signal;
- a second color conversion table converting in a state retaining saturation of the image signal; and
- a third color conversion table converting the background color.

6. An image processing method for converting an input image signal into a control signal including a plurality of output color factors of an image forming apparatus, said image processing method comprising the steps of:
- (a) determining a type and attributes of a drawing object from the input image signal;
- (b) extracting background color information corresponding to a determination result of the step (a); and
- (c) conducting a color conversion with respect to the input image signal based on the type and attributes of the drawing object and the background color; and wherein the step (c) includes:
- (d) storing a plurality of color conversion tables;
- (e) referring to the type and attributes of the drawing object and the background color information and selecting one color conversion table from the plurality of the color conversion tables; and
- (f) conducting a compensation calculation with respect to the image data based on the color conversion table selected in the step (e).

7. The image processing method as claimed in claim 6, wherein the background color information is an average value of a background color in an area where the drawing object is formed.

8. The image processing method as claimed in claim 6, wherein the type of the drawing object is one of character code, graphic code, and raster graphic data.

9. The image processing method as claimed in claim 6, wherein the attributes of the drawing object include at least one of a type, a size, and a thickness.

* * * * *